United States Patent [19]

Braeger et al.

[11] Patent Number: 4,958,409

[45] Date of Patent: Sep. 25, 1990

[54] METHOD AND APPARATUS FOR TURNING OVER AND STRETCHING FISH FILLETS

[75] Inventors: Horst K. H. Braeger; Hugo Pontow, both of Lübeck, Fed. Rep. of Germany

[73] Assignee: Nordischer Maschinenbau Rud. Baader GmbH & Co., Lubeck, Fed. Rep. of Germany

[21] Appl. No.: 433,023

[22] Filed: Nov. 7, 1989

[30] Foreign Application Priority Data

Nov. 10, 1988 [DE] Fed. Rep. of Germany ....... 3838154

[51] Int. Cl.⁵ .............................................. A22B 5/00
[52] U.S. Cl. ........................................... 17/24; 17/55; 17/45
[58] Field of Search ................. 17/45, 57, 53, 55, 24

[56] References Cited

U.S. PATENT DOCUMENTS

| | | | |
|---|---|---|---|
| 4,613,031 | 9/1986 | Wenzel | 17/24 |
| 4,651,385 | 3/1987 | Persson | 17/24 |
| 4,744,131 | 5/1988 | Hartmann et al. | 17/55 |

FOREIGN PATENT DOCUMENTS

| | | | |
|---|---|---|---|
| 192103 | 10/1964 | Sweden | 17/57 |
| 1219693 | 1/1971 | United Kingdom | 17/57 |

Primary Examiner—Willis Little
Attorney, Agent, or Firm—Morrison Law Firm

[57] ABSTRACT

In an apparatus for the automatic turning over of fish fillets and the conveying-on of the same in a stretched position, three staggered, superimposed belt conveyors oriented and driven in the same direction and being provided as a feeding conveyor, a collecting conveyor and a stretching conveyor are used. The feeding conveyor, whose conveying surface is spaced from that of the collecting conveyor by a distance at least corresponding to the length of the largest fillet to be handled ends above the collecting conveyor in such a way that in the vertical projection between the end of the feeding conveyor and the start of the collecting conveyor a gap is left, which is bridged by the catching element arranged below the plane of the conveying surface of the latter and which is inclined with respect thereto. The collecting conveyor and the stretching conveyor are located directly above one another, but are not in contact, a deflection wedge between them being filled by a transfer roller.

11 Claims, 1 Drawing Sheet

METHOD AND APPARATUS FOR TURNING OVER AND STRETCHING FISH FILLETS

BACKGROUND OF THE INVENTION

1. Field of the Invention

The invention relates to a method for the automatic turning over of fish fillets, with each fillet being conveyed lying in flat position, as well as to an apparatus for performing such turning-over method.

2. Prior Art

In modern high capacity filleting lines of the fish processing industry, it is a question of ensuring that the fillets, without being touched by hand, pass reliably through the individual fillet processing stations. The fillets must e.g. be oriented in the correct manner for skinning, which, depending on the filleting machine type used, can make it necessary for the fillets to be reversed both about the longitudinal and the transverse axis, whilst ensuring that the fillets are conveyed lying flat.

Such an apparatus is disclosed by DE-OS No. 14 54 072. This apparatus uses a reversibly driven conveyor belt above which ends a further conveyor belt supplying the fillets, the reciprocal spacing between the belts being smaller than the length of the fillets to be handled. In the end region of said conveyor belt is provided a fillet-displaceable operating device, which ensures that the lower conveyor belt rotates in the opposite direction on actuation and in the same direction in the inoperative position. This ensures that the fillets are turned over sideways and lengthways. As a result of the reversing operating mode, such an apparatus is unable to comply with modern performance requirements.

3. Objects of the Invention

It is therefore the main object of the present invention to propose a method and an apparatus complying with these requirements.

It is a further essential object of the invention to ensure by applying such method that the fillets can be taken over safely lying in a flat position.

SUMMARY OF THE INVENTION

According to the present invention these objects are achieved by a method in which each fillet, being conveyed lying in a flat position and in the direction of its longitudinal axis and being transferred to a lower-lying, actively conveying plane, is deflected into a substantially vertical position, whilst a turnover moment is imparted on the fillet and the latter is brought into a free fall, whereupon its leading end is caught and the fillet is then conveyed-on accompanied by engagement on the part following the leading end. According to an essential aspect of the invention, this method can be performed by an apparatus comprising a feeding or supplying conveyor conveying the fillets lying in a flat position and in the direction of the fillet's longitudinal axis, and a collecting conveyor arranged below the feeding conveyor for the conveying-on of the turned over fillets, which apparatus is characterized in that the movement direction of the feeding conveyor surface and of the collecting conveyor surface are the same, that the vertical spacing of the planes of the conveying surfaces at least corresponds to the length of the largest fillet to be handled and that a planar catching element is associated with the conveying surface of the collecting conveyor in the area below the feeding conveyor end.

The advantages attainable with such method and apparatus are in particular that the fillets are reliably turned over and conveyed-on in stretched form even when conveyed in very close order, which is of decisive importance e.g. for carrying out in troublefree manner a deep-skinning process.

For assisting the stretching process, the catching element can be arranged to cover the conveying surface of the collecting conveyor below the area of the end of the feeding conveyor, the catching surface of the catching element can be inclined in the conveying direction of the collecting conveyor and the latter can have its conveying surface rise in the conveying direction.

According to an embodiment to be used depending on the constructional circumstances, the end of the feeding conveyor and the beginning of the collecting conveyor can be associated with one another, whilst leaving a gap when seen in a vertical plan view of the apparatus, which gap is bridged by the catching element.

In the case of an apparatus with a collecting conveyor guided in continuous or endless manner by means of guide or deflection rollers, the aforementioned, last-described variant can be so constructed that the catching element is arranged at a substantially radial orientation to the deflection roller of the collecting conveyor and with its catching surface below the plane thereof and that it forms an angle smaller that 90° with the vertical tangent at the deflection roller.

Particularly reliable results may be obtained if the conveying surface of the collecting conveyor is designed to effect a good and firm grip on the handled fillet.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. There is shown in FIG. 1 a side view of the apparatus in simplified form;

BRIEF DESCRIPTION OF THE PREFERRED EMBODIMENTS

Figure 1:
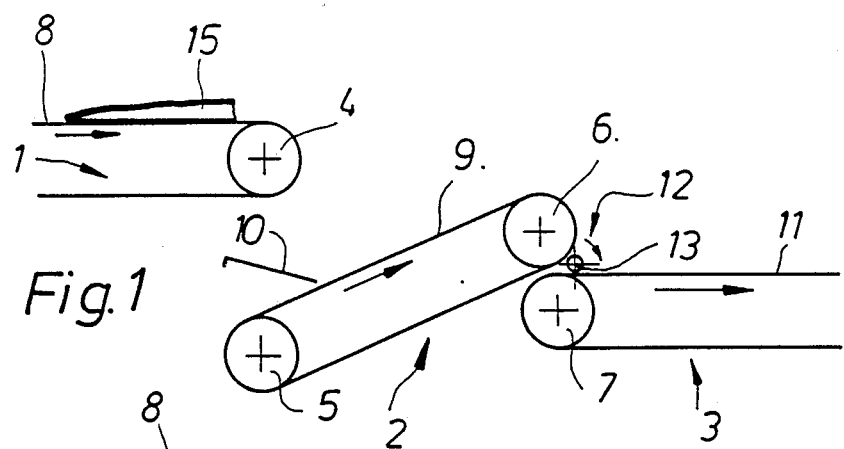

According to FIG. 1, the apparatus comprises a feeding or supplying conveyor 1, a collecting conveyor 2 and a stretching conveyor 3, which conveyors are driven to move endlessly about deflection rollers 4 to 7, respectively. These rollers are appropriately mounted in a not shown machine frame. Flexible flat belts wrap around each one of the deflection rollers 4 to 7, the deflection roller 4 being associated with the feeding conveyor 1 and the deflection roller 7 with the stretching conveyor 3. For simplification reasons the second deflection rollers of both the feeding conveyor 1 and the stretching conveyor 3 are not shown. One of the deflection rollers each is driven to rotate in the same direction in an appropriate manner.

As shown in FIG. 1 the feeding conveyor 1 ends above the collecting conveyor 2, a conveying surface 9 of the latter having a spacing from a conveying surface 8 of the former which corresponds at least to the length of the largest fish fillet 15 to be handled. In the vertical area below the end of the feeding conveyor 1, the conveying surface 9 of the collecting conveyor 2 is covered by a planar catching element 10, which is inclined in the conveying direction and arranged in such a way that the transition region between the catching element 10 and the conveying surface 9 is displaced or offset in the conveying direction with respect to the vertical projection of the terminal edge of the feeding conveyor 1 on the conveying surface 9 of the collecting conveyor 2. In turn, the collecting conveyor 2 ends above the stretching conveyor 3, a deflection wedge 12 between a conveying surface 11 of the stretching conveyor 3 and the deflection roller 6 of the collecting conveyor 2 being bridged by a transfer roller 13. This is also appropriately mounted in the not shown machine frame and rotated in the same direction as the deflection rollers.

Figure 2:
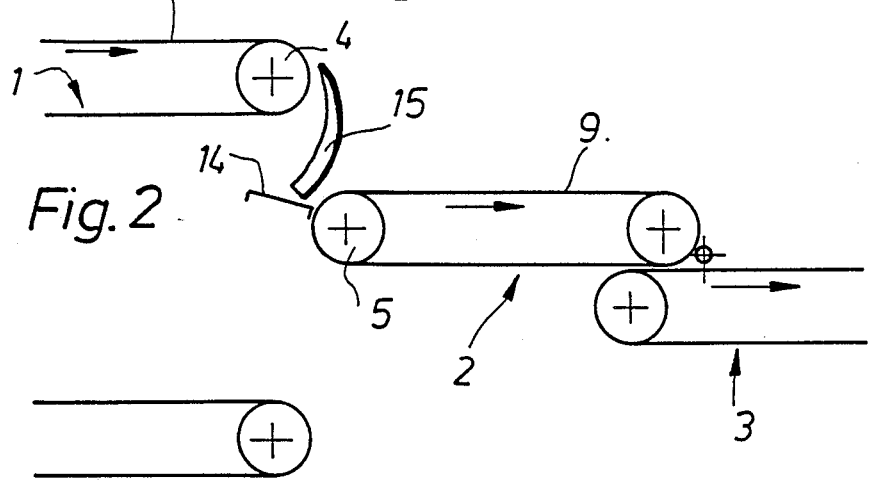
FIG. 2 a side view of the apparatus in a modified construction with a fish fillet just being turned over.
Figure 3:
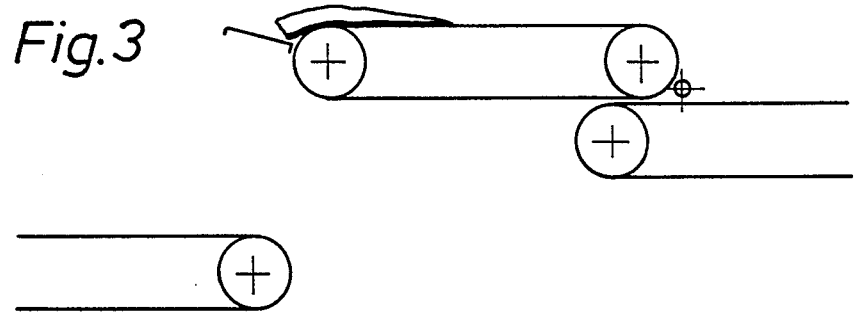
FIG. 3 a side view of the apparatus of FIG. 2 with the fish fillet turned over.
Figure 4:
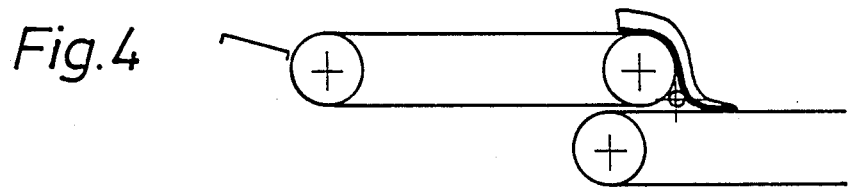
FIG. 4 a side view of the apparatus of FIG. 2 with a fish fillet in the final stretching stage.

According to the embodiment shown in FIGS. 2 to 4, the collecting conveyor 2 is also arranged below the feeding conveyor 1, but in such a way that the end of the feeding conveyor 1 is displaced or offset with respect to the beginning of the collecting conveyor 2, whilst leaving a gap appearing in the vertical projection, and that this gap is bridged by a flat or planar catching element 14. The catching element 14 is arranged at a substantially radial orientation to the deflection roller 5 of the collecting conveyor 2 and with its catching surface below the plane of the conveying surface 9 of the collecting conveyor 2 and, with the vertical tangent at the deflection roller 4, forms an angle smaller than 90°. The conveying surface 9 of the collecting conveyor 2, in this embodiment, is substantially horizontal and, corresponding to the construction according to FIG. 1 and taking into account the interposition of the transfer roller 13, passes into the stretching conveyor 3.

The apparatus functions as follows:

A fish fillet 15, e.g. from a filleting machine of the type which supplies a fillet with its head removal cut face leading, is conveyed lying on the conveying surface 8 of the feeding conveyor 1 (in this case also forming the fillet belt of the filleting machine) to arrive in the area of the deflection roller 4. Due to the softness of the fillet 15 the latter follows the deflection and, depending on the conveying speed, is detached earlier or later from the conveying surface 8. Following the force of gravity, the head removal cut face of fillet 15 firstly strikes the catching element 10 or 14 and is then received with its turning over remaining part on the conveying surface 9 of the collecting conveyor 2. As shown in FIG. 3, part of the fillet is now on the catching surface of catching element 10 or 14 and as a result of the inclined arrangement thereof is urged against the collecting conveyor 2. By means of the part of the fillet 15 resting on the conveying surface 9 of the collecting conveyor 2, there is an entrainment thereof by friction, the part resting without entraining on the catching surface of the catching element 10 or 14 producing a holdback or retarding moment, which is finally overcome. Thus, the fillet 15 arrives in the region of the deflection roller 6, whose deflection it follows as a result of its softness. The transfer roller 13 being arranged at a limited spacing from the conveying surfaces 9 and 11 of the collecting conveyor 2 or stretching conveyor 3, respectively, and rotating more rapidly than the conveying speed of the collecting conveyor 2 effects the transfer of the fillet 15 onto the conveying surface 11 of the stretching conveyor 3. The stretching conveyor's conveying speed, which is higher than the rotational speed of the transfer roller 13 ensures that the fillets 15 can be introduced in a completely stretched position e.g. into a deep skinning machine.

What is claimed is:

1. A method for the automatic turning over of fish fillets defining a longitudinal axis, with each fillet being conveyed lying in a flat position and in the direction of its longitudinal axis and being transferred to a lower-lying, actively conveying plane, wherein each fillet
   (a) is deflected into a substantially vertical position whilst a turnover moment is imparted thereon,
   (b) is brought into a free fall, and
   (c) is then caught at its leading end and conveyed-on accompanied by engagement on the part following said leading end of the fillet.

2. An apparatus for the automatic turning over of fish fillets defining a longitudinal axis, said apparatus comprising a feeding conveyor having a first conveying surface and conveying said fillets in flat position and in the direction of said longitudinal axis, and a collecting conveyor including a second conveying surface and arranged below the feeding conveyor for the further conveying of the turned-over fillets, wherein
   the movement directions of said first conveying surface of said feeding conveyor and of said second conveying surface of said collecting conveyor are the same,
   a vertical spacing of the planes of said first and second conveying surfaces at least corresponds to the length of the largest of said fillets to be handled, and
   a planar catching element defining a catching surface is provided in association with said second conveying surface of said collecting conveyor in an area below the end of said feeding conveyor.

3. An apparatus as claimed in claim 2, wherein said catching element is arranged to cover said conveying surface of said collecting conveyor below said area of said end of said feeding conveyor.

4. An apparatus as claimed in claim 2, wherein said catching surface of said catching element is inclined in the conveying direction of said collecting conveyor, and wherein said second conveying surface rises in said conveying direction.

5. An apparatus as claimed in claim 2, wherein said end of said feeding conveyor and start of said collecting conveyor are associated with one another so as to leave a gap appearing in a vertical plan view of said apparatus, which gap is bridged by said catching element.

6. An apparatus as claimed in claim 5 wherein said collecting conveyor comprises deflection roller means for guiding it continuously, wherein said catching element is arranged with a substantially radial orientation to the feeding-conveyor-end deflection roller means of said collecting conveyor and with said catching surface below the plane of said collecting conveyor, and, with a vertical tangent at said deflection roller, forms an angle smaller than 90°.

7. An apparatus as claimed in claim 2, wherein said second conveying surface is designed to produce gripping effect on the fillet.

8. An apparatus as claimed in claim 3, wherein said second conveying surface is designed to produce a gripping effect on the fillet.

9. An apparatus as claimed in claim 4, wherein said second conveying surface is designed to produce a gripping effect on the fillet.

10. An apparatus as claimed in claim 5, wherein said second conveying surface is designed to produce a gripping effect on the fillet.

11. An apparatus as claimed in claim 6, wherein said second conveying surface is designed to produce a gripping effect on the fillet.

* * * * *